L. C. VAN RIPER.
STARTING MECHANISM FOR EXPLOSIVE ENGINES.
APPLICATION FILED APR. 5, 1911.
1,129,252.
Patented Feb. 23, 1915.
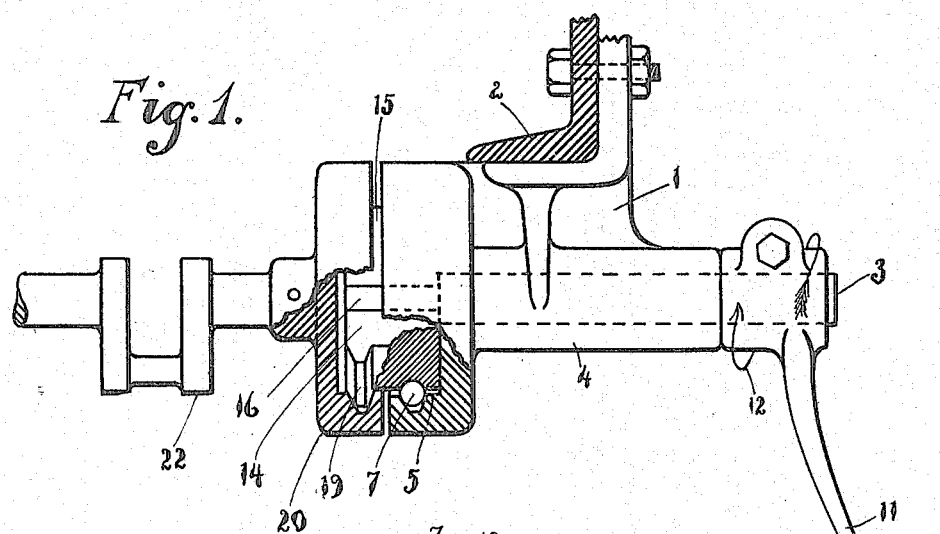
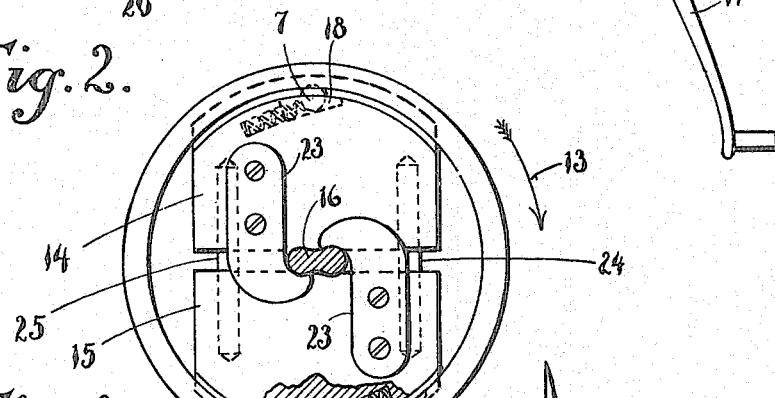
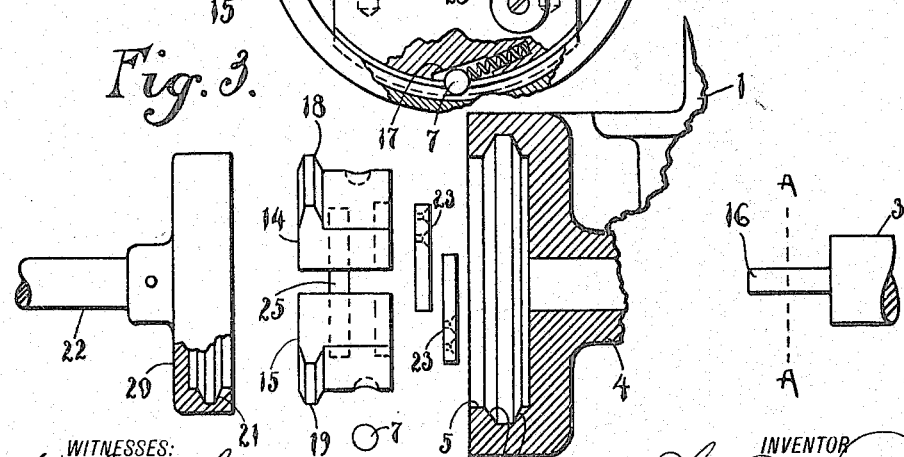

UNITED STATES PATENT OFFICE.

LEWIS C. VAN RIPER, OF NEW YORK, N. Y.

STARTING MECHANISM FOR EXPLOSIVE-ENGINES.

1,129,252.  Specification of Letters Patent.  Patented Feb. 23, 1915.

Application filed April 5, 1911. Serial No. 618,997.

*To all whom it may concern:*

Be it known that I, LEWIS C. VAN RIPER, of the borough of Manhattan, city, county, and State of New York, have invented certain new and useful Improvements in Starting Mechanisms for Explosive-Engines, of which the following is a specification.

The purpose of this invention is to provide a starting device for explosive engines that will release the crank handle, or other means used in starting the engine from the engine shaft when a premature explosion occurs, and is an improvement upon several pending applications for Letters Patent filed by me in the United States Patent Office as follows: Sept. 12, 1910, Serial No. 581,600; Oct. 6, 1910, Serial No. 585,577; January 25, 1911, Serial No. 604,565; Feb. 20, 1911, Serial No. 609,760; Feb. 23, 1911, Serial No. 610,168; Feb. 24, 1911, Serial No. 610,562, and two applications filed by me jointly with Abraham Novick as follows: Nov. 30, 1910, Serial No. 594,834 and Dec. 14, 1910, Serial No. 597,335, in both of which I have acquired the entire interest of said Abraham Novick by assignments duly recorded in the United States Patent Office. In this application I have shown a new method for preventing the rollers from slipping on a backfire of the engine and in some cases it might be found preferable to the other methods shown in the several pending applications above referred to.

A further object is to make the releasing means more positive than heretofore.

Reference is to be had to the accompanying drawings forming a part of this specification.

Like numerals of reference wherever they occur denote like parts throughout this specification and drawings wherein:

Figure 1 is a side view of this device partly in section, Fig. 2 is an end view of the clutch mechanism, Fig. 3 shows several of the parts in detail, Fig. 4 is a section on line A—A of Fig. 3.

In the practical embodiment this invention consists of a supporting member 1, that may be fastened to the front cross member 2 of an automobile frame or any other suitable place, which carries the crank handle shaft 3. At one end of the bearing 4 is the non-rotatable roller race 5 which preferably has a groove 6 and angular sides for the rollers 7 to run in. The object of this said groove 6 is to provide substantial means to prevent the rollers 7 from slipping on its race 5, and as this forms the main feature of my invention, I do not wish to confine myself to specific details in the rest of the mechanism of the starting device as it is very evident that these said specific details can be varied considerably without departing from the scope of this invention which relates particularly to means for preventing the releasing friction rollers from slipping upon back fire.

Upon forward rotation of the crank handle 11 in the direction of arrow 12 of Fig. 1 and arrow 13 of Fig. 2 the radially slidable clutch members 14 and 15, which are guided upon each other by the plungers 24 and 25, are rotated by the flattened portion 16 of the crank handle shaft 3, at the opposite end of which the crank handle 11 is fastened. Upon continued forward rotation of the crank handle 11 the rollers 7 are forced back to the deeper ends of their inclined seats 17 and 18 thus allowing the clutch members 14 and 15 to slide apart until the wedge shaped friction shoes 18 and 19 grip the friction disk 20 which is fastened to the engine shaft 22, in the wedge shaped groove 21 and any further continued rotation of the crank handle 11 is then transmitted to the engine shaft 22. Should a premature explosion occur while the engine shaft 22 is being rotated forward as set forth, the engine shaft 22 and disk 20 will be rotated backward while the clutch members 14 and 15 will be prevented from following by means of the friction rollers 7 becoming wedged against the non-rotatable friction surface 5. This wedging of the friction rollers 7 causes the friction shoes 18 and 19 to release the friction disk 20 thus allowing this friction disk 20 to slip backward without taking along the clutch members 14 and 15 and the crank handle 11. It will be noted that upon back fire there will be a tendency for the friction rollers 7 to slip on the non-rotatable friction surface 5 but are prevented from doing so in the preferred form as shown in Fig. 1 by means of the wedge shaped groove 6 in which the rollers 7 roll. When the engine starts forward under its own power the clutch members 14 and 15 release the friction disk 20 by means of the disengaging plates 23 causing the clutch members 14 and 15 to contract on account of their speed being greater than the speed of the crank handle shaft 3.

What I claim, is:—

In a starting device adapted to be used in connection with explosive engines, the combination of an annular friction surface upon or connected to an engine shaft, a coöperative friction clutch member at all times rotatable both forward and backward, means for rotating and frictionally connecting said coöperative clutch member to said first named friction surface by a single operation, a non-rotatable friction surface, a plurality of rollers and springs for dis-engaging said coöperative clutch member from said first-named friction surface upon backward rotation of said engine shaft by its engine and a groove in one of said clutch members to prevent the rollers from slipping when the engine backfires.

LEWIS C. VAN RIPER.

Witnesses:
ABRAHAM NOVICK,
JOSEPH E. MORHARDT.

Copies of this patent may be obtained for five cents each, by addressing the "Commissioner of Patents, Washington, D. C."